(12) United States Patent
Zheng

(10) Patent No.: US 8,467,683 B2
(45) Date of Patent: Jun. 18, 2013

(54) MAPPING METHOD, APPARATUS, AND SYSTEM FOR DATA TRANSMISSION

(75) Inventor: Ruobin Zheng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 215 days.

(21) Appl. No.: 13/070,254

(22) Filed: Mar. 23, 2011

(65) Prior Publication Data

US 2011/0170865 A1    Jul. 14, 2011

Related U.S. Application Data

(63) Continuation of application No. PCT/CN2009/073806, filed on Sep. 8, 2009.

(30) Foreign Application Priority Data

Sep. 24, 2008    (CN) .......................... 2008 1 0222778

(51) Int. Cl.
*H04B 10/20*    (2006.01)
*H04J 14/00*    (2006.01)
*H04J 14/02*    (2006.01)

(52) U.S. Cl.
CPC .................. *H04J 14/0227* (2013.01)
USPC ............................... 398/58; 398/66

(58) Field of Classification Search
USPC .................... 398/58, 66, 67, 70–72
See application file for complete search history.

(56) References Cited

U.S. PATENT DOCUMENTS

| | | | |
|---|---|---|---|
| 6,967,949 B2 * | 11/2005 | Davis et al. | 370/390 |
| 7,257,120 B2 * | 8/2007 | Saunders et al. | 370/395.21 |
| 7,983,277 B1 * | 7/2011 | Johnson | 370/401 |
| 2004/0028064 A1 | 2/2004 | Cetin et al. | |
| 2004/0205230 A1 * | 10/2004 | Fontana et al. | 709/236 |
| 2005/0074238 A1 | 4/2005 | Sung et al. | |
| 2005/0180192 A1 | 8/2005 | Nishihara | |

(Continued)

FOREIGN PATENT DOCUMENTS

| | | |
|---|---|---|
| CN | 1592302 A | 3/2005 |
| CN | 1725756 A | 1/2006 |

(Continued)

OTHER PUBLICATIONS

Written Opinion of the International Searching Authority issued in corresponding PCT Patent Application No. PCT/CN2009/073806, mailed Dec. 17, 2009.

(Continued)

*Primary Examiner* — Dalzid Singh
(74) *Attorney, Agent, or Firm* — Brinks Hofer Gilson & Lione

(57) ABSTRACT

A mapping method, an apparatus, and a system for data transmission are provided, so as to solve a problem that mapping between a Passive Optical Network (PON) service transmission path and a Pseudo Wire (PW) and/or a Packet Switched Network (PSN) tunnel cannot be realized on a premise of ensuring Quality of Service (QoS) of data transmission. Data packets are classified according to own attribute information in PSN tunnel information and/or PW information. When Multi Protocol Label Switch (MPLS) tunnel information carried in the data packets includes the PSN tunnel information or the PW information, the data packets are classified according to Class of Service (CoS) information, and/or label information in the PSN tunnel information or the PW information; and then the classified data packets are respectively mapped to service transmission paths of different PONs. The invention is applied to a PON to support packet switching technology.

11 Claims, 8 Drawing Sheets

U.S. PATENT DOCUMENTS

2007/0211763 A1    9/2007   Solomon et al.
2011/0267950 A1*  11/2011   Solomon .................. 370/235

FOREIGN PATENT DOCUMENTS

| CN | 101039159 A | 9/2007 |
| CN | 101179469 A | 5/2008 |
| GB | 2431067 A | 4/2007 |
| WO | WO 2005/034568 A1 | 4/2005 |
| WO | WO 2008/055393 A1 | 5/2008 |

OTHER PUBLICATIONS

International Search Report issued in corresponding PCT Patent Application No. PCT/CN2009/073806, mailed Dec. 17, 2009.

International Telecommunication Union, "Gigabit-capable Passive Optical Networks (G-PON): Transmission Convergence Layer Specification" Series G: Transmission Systems and Media, Digital Systems and Networks: Digital Sections and Digital Line System—Optical Line Systems for Local and Access Networks, G.984.3, Feb. 2004.

Office Action issued in corresponding Chinese Patent Application No. 200810222778.1, mailed May 3, 2012.

Extended European Search Report issued in corresponding European Patent Application No. 09817214.1, mailed May 16, 2012.

Chinese Patent No. 101686190, issued on Jan. 30, 2013, granted in corresponding Chinese Patent Application No. 200810222778.1.

* cited by examiner

MAPPING METHOD, APPARATUS, AND SYSTEM FOR DATA TRANSMISSION

CROSS-REFERENCE TO RELATED APPLICATIONS

This application is a continuation of International Application No. PCT/CN2009/073806, filed on Sep. 8, 2009, which claims priority to Chinese Patent Application No. 200810222778.1, filed on Sep. 24, 2008, both of which are hereby incorporated by reference in their entireties.

FIELD OF THE INVENTION

The present invention relates to the field of communication technology, and in particular, to a mapping method, an apparatus, and a system for data transmission.

BACKGROUND OF THE INVENTION

Passive Optical Network (PON), as a bandwidth optical access technology, employs a point-to-multipoint topological structure, and as shown in FIG. 1, the PON includes an Optical Network Terminal (OLT), a passive Optical Distribution Network (ODN), and an Optical Network Unit (ONU). The OLT provides a network side interface, and is connected to at least one ODN; the ONU provides a user side interface, and is connected to an ODN; and the ODN transmits downlink data of the OLT to each ONU through optical distribution, and transmits uplink data of ONU to the OLT through convergence.

Ethernet Passive Optical Network (EPON) and Gigabit Passive Optical Network (GPON) are two newest PON technologies.

In the EPON, the OLT directly allocates a transmission time window to an ONU; and an identifier of a service transmission path allocated by the OLT to the ONU is called as a Logical Link Identifier (LLID).

In the GPON, the service transmission path is called as a GPON Encapsulation Method PORT (GEM PORT); and the ONU supports at least one Transmission Container (T-CONT), and the T-CONT supports at least one GEM PORT.

A Packet Switch Network (PSN) tunnel is a data transfer path formed by spanning a PSN from a Provider Edge (PE) to an opposite PE. A Pseudo Wire (PW) is a kind of PSN tunnel. Multiple PWs may be multiplexed in one PSN tunnel. As shown in FIG. 2, two PEs being PE1 and PE2 provide at least one PW for Customer Edges (CEs) being CE1 and CE2 connected thereto, to enable the corresponding CEs to communicate with each other on the PSN. PE1 encapsulates a local data unit sent from CE1 into a PW Protocol Data Unit (PW-PDU), and transfers the PW-PDU to PE2 through the PSN tunnel; and PE2 decapsulates the received PW-PDU, to obtain the local data unit; and sends the local data unit to CE2.

At present, the PSN tunnel and the PW are generally encapsulated in a Multi Protocol Label Switch (MPLS) encapsulation mode.

MPLS message is 32 Bit, in which 20 Bit is used as MPLS label information, in which the MPLS label information is configured to identify a path forwarding destination address; and another 3 Bit in the message is generally used as Class of Service (CoS) information, in which the CoS information is configured to identify CoS of forwarded data packets.

In the implementation of the present invention, the inventor finds that the prior art at least has the following problems. When a network employs both a PON mode and a PSN mode, the data transmission path is not only a PON service transmission path, but also a PW and/or a PSN tunnel. All the PON service transmission path, the PW, and/or the PSN tunnel provide different Quality of Services (QoSs) for data transmission; however, in the prior art, mapping between the PON service transmission path and the PW and/or the PSN tunnel cannot be realized on a premise of ensuring QoS of data transmission.

SUMMARY OF THE INVENTION

In an aspect, the present invention is directed to a mapping method for data transmission, so as to ensure QoS of data transmission after mapping between a PON service transmission path and a PW and/or a PSN tunnel.

In order to achieve the above objective, the present invention employs the following technical solution.

A mapping method for data transmission is provided, where the method includes:

receiving a service stream, in which the service stream includes at least two data packets;

acquiring MPLS tunnel information in the data packets, in which the MPLS tunnel information includes own attribute information, CoS information, and/or label information in PSN tunnel information and/or PW information; and classifying the data packets according to the MPLS tunnel information, and mapping the classified data packets respectively to service transmission paths of different PONs.

In an aspect, the present invention is directed to a mapping apparatus for data transmission, so as to ensure QoS of data transmission after mapping between a PON service transmission path and a PW and/or a PSN tunnel.

In order to achieve the above objective, the present invention employs the following technical solution.

A mapping apparatus for data transmission is provided, where the apparatus includes:

a service interface unit, configured to receive a service stream, in which the service stream includes at least two data packets;

a tunnel information unit, configured to acquire MPLS tunnel information in the data packets, in which the MPLS tunnel information includes own attribute information, CoS information, and/or label information in PSN tunnel information and/or PW information;

a QoS mapping unit, configured to classify the data packets according to the MPLS tunnel information, and map the classified data packets respectively to service transmission paths of different PONs; and a PON sending unit, configured to send the data packets through the service transmission paths to which the data packets are mapped.

In an aspect, the present invention is directed to a mapping system for data transmission, so as to ensure QoS of data transmission after mapping between a PON service transmission path and a PW and/or a PSN tunnel.

In order to achieve the above objective, the present invention employs the following technical solution.

A mapping system for data transmission is provided, which includes an ONU and an OLT, in which the ONU and the OLT have at least one service transmission path.

The ONU receives a service stream including at least two data packets, and acquires MPLS tunnel information in the data packets; and classifies the data packets according to the MPLS tunnel information, maps the classified data packets respectively to service transmission paths of different PONs, and sends the data packets to the OLT.

Alternatively, the OLT receives a service stream including at least two data packets, acquires MPLS tunnel information in the data packets; and classifies the data packets according to the MPLS tunnel information, maps the classified data packets respectively to service transmission paths of different PONs, and sends the data packets to the ONU.

The MPLS tunnel information includes own attribute information, CoS information, and/or label information in PSN tunnel information and/or PW information.

According to the mapping method, the apparatus, and the system for data transmission according to the present invention, data packets are respectively mapped to service transmission paths of different PONs according to MPLS tunnel information, so as to solve a problem that mapping between a PON service transmission path and a PW and/or a PSN tunnel cannot be realized on a premise of ensuring QoS of data transmission, such that the QoS of the data transmission is ensured after mapping between the PON service transmission path and the PW and/or the PSN tunnel.

BRIEF DESCRIPTION OF THE DRAWINGS

To illustrate the technical solutions according to the embodiments of the present invention or in the prior art more clearly, the accompanying drawings for describing the embodiments or the prior art are introduced briefly in the following. Apparently, the accompanying drawings in the following description are only some embodiments of the present invention, and persons of ordinary skill in the art can derive other drawings from the accompanying drawings without creative efforts.

DETAILED DESCRIPTION OF THE EMBODIMENTS

The technical solution of the present invention will be clearly and completely described in the following with reference to the accompanying drawings. It is obvious that the embodiments to be described are only a part rather than all of the embodiments of the present invention. All other embodiments acquired by persons skilled in the art based on the embodiments of the present invention without creative efforts shall fall within the protection scope of the present invention.

In order to ensure QoS of data transmission after mapping between a PON service transmission path and a PW and/or a PSN tunnel, in an embodiment, the present invention provides a mapping method for data transmission. Hereinafter, the mapping method for data transmission is described respectively in an uplink direction and a downlink direction.

Figure 1:
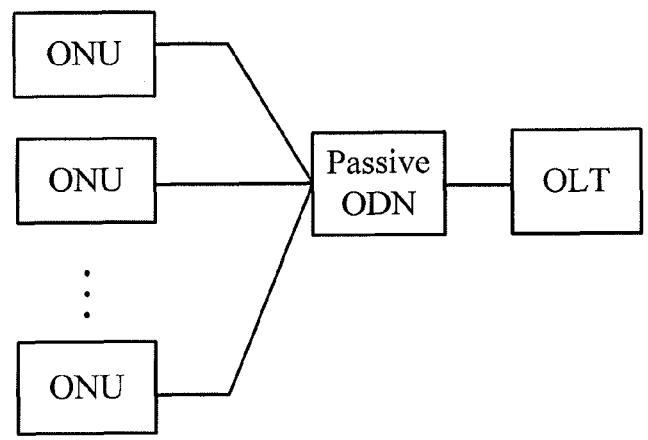
FIG. 1 is a network architecture diagram of a PON in the prior art.
Figure 2:
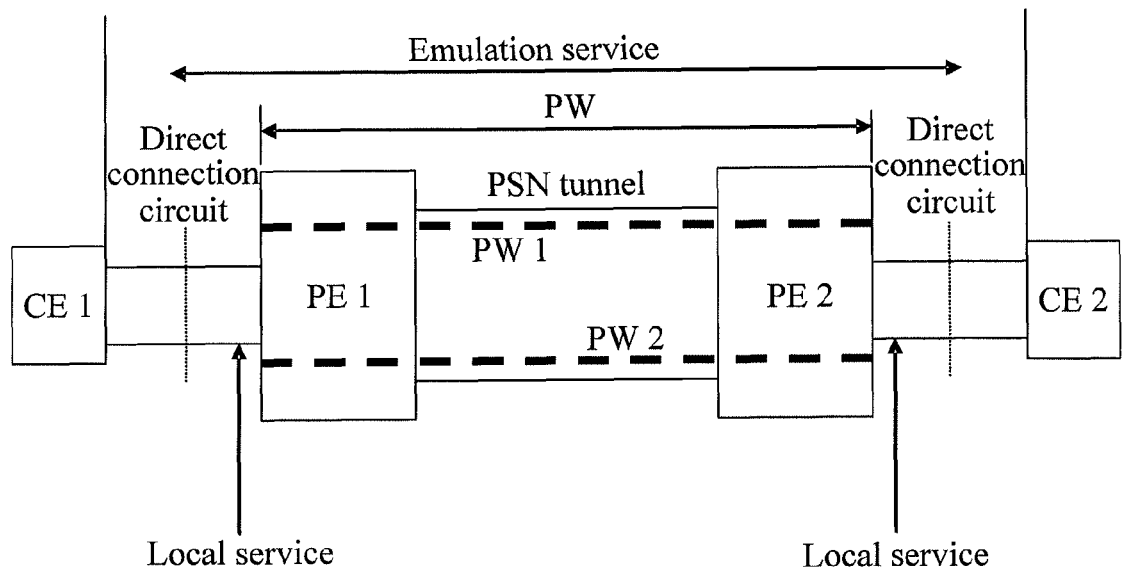
FIG. 2 is a diagram of a reference model of a Pseudo-Wire Emulation Edge to Edge (PWE3) network in the prior art.
Figure 3:
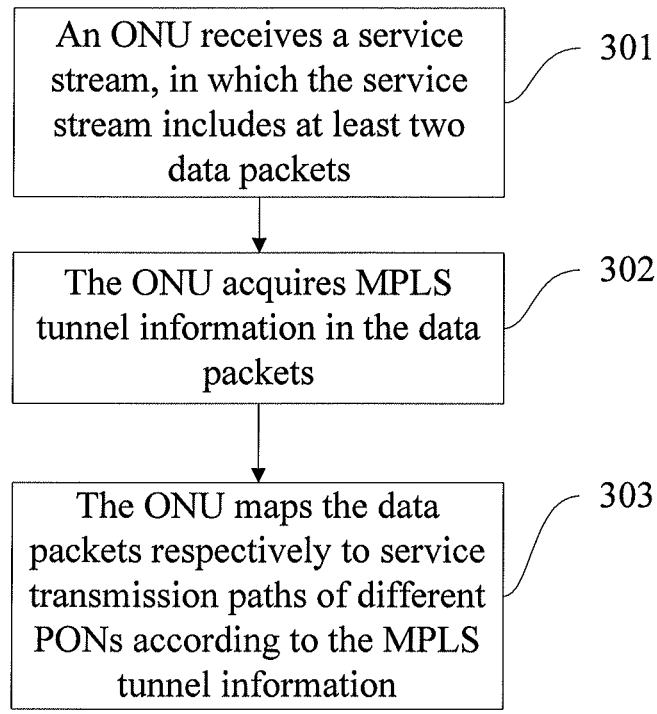
FIG. 3 is a schematic view of a mapping method for data transmission according to an embodiment of the present invention.

As shown in FIG. 3, in the uplink direction, the mapping method for data transmission according to the embodiment of the present invention includes the following steps.

In Step 301, an ONU receives a service stream, in which the service stream includes at least two data packets.

In an uplink direction from the ONU to an OLT, the ONU receives a service stream transferred from a user side, in which the service stream includes at least two data packets.

In Step 302, the ONU acquires MPLS tunnel information in the data packets, in which the MPLS tunnel information includes own attribute information, CoS information, and/or label information in PSN tunnel information and/or PW information.

In the uplink direction from the ONU to the OLT, the data packets received by the ONU do not carry MPLS tunnel information; and thus the ONU adds the MPLS tunnel information to the data packets. The MPLS tunnel information includes own attribute information, CoS information, and/or label information in PSN tunnel information and/or PW information; and the own attribute information in the PSN tunnel information and/or the PW information includes attribute identifiers that distinguish different PSN tunnel information and/or PW information.

In Step 303, the ONU classifies the data packets according to the MPLS tunnel information, and maps the classified data packets respectively to service transmission paths of different PONs.

The MPLS tunnel information includes the PSN tunnel information and/or the PW information; the PSN tunnel information includes the own attribute information; and the PW information includes the own attribute information. The ONU can distinguish PSN tunnels or PWs according to the own attribute information in the PSN tunnel information and/or the PW information. The ONU classifies the data packets according to the own attribute information, and maps the classified data packets respectively to service transmission paths of different PONs, through methods including the following.

1. The ONU classifies data packets having the same own attribute information in the PSN tunnel information and the same own attribute information in the PW information into one type according to the own attribute information in the PSN tunnel information and the PW information, and maps the data packets classified into the same type to a service transmission path of the same PON. That is to say, the data packets of the same PSN tunnel and the same PW are classified into one type, and mapped to the same GEM PORT/LLID.

Figure 9A:
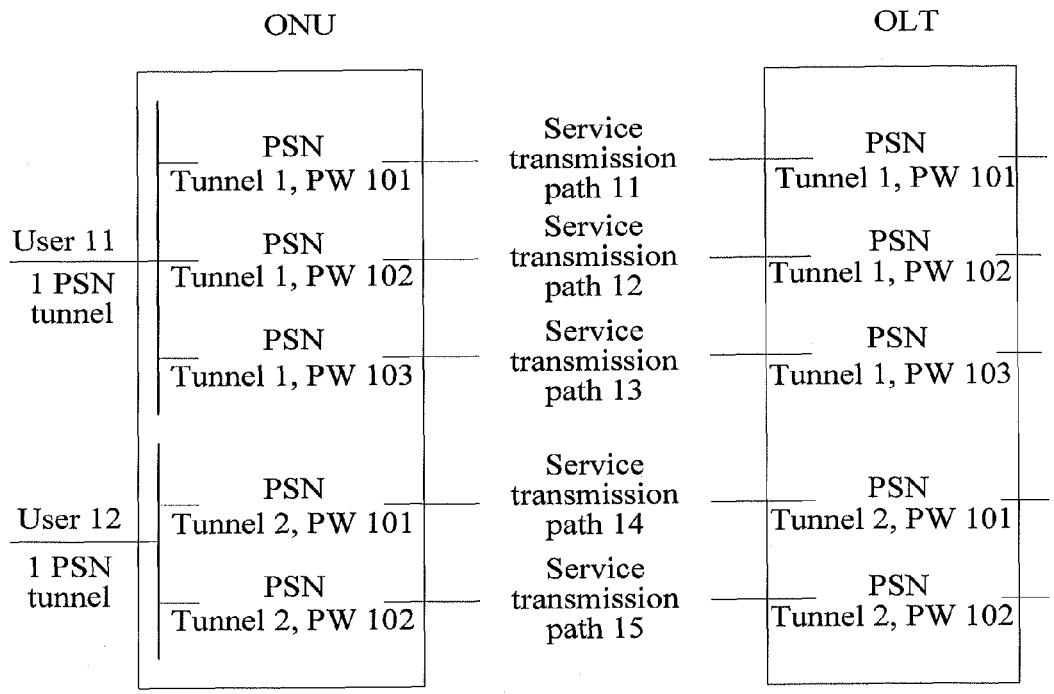
FIG. 9(a) is a principle diagram of mapping data packets of the same PSN tunnels and the same PWs by an ONU or an OLT to a same GEM PORT in an embodiment of the present invention; (b) is a principle diagram of mapping data packets of all PWs of same PSN tunnel by an ONU or an OLT to the same GEM PORT in case that one user is corresponding to one external layer PSN tunnel, in an embodiment of the present invention; and (c) is a principle diagram of mapping data packets of all PWs of same PSN tunnel by an ONU or an OLT to the same GEM PORT in case that one user is corresponding to multiple external layer PSN tunnels, in an embodiment of the present invention.

For example, as shown in FIG. 9(a), in case that a user 11 is corresponding to PSN tunnel 1, and a user 12 is corresponding to PSN tunnel 2, the ONU maps data packets of PSN tunnel 1 and PW101 to GEM PORT11 for transmission, maps data packets of PSN tunnel 1, and PW102 to GEM PORT12 for transmission, . . . , and maps data packets of PSN tunnel 2 and PW102 to GEM PORT15 for transmission.

2. The ONU classifies data packets having the same own attribute information in the PSN tunnel information into one type according to the own attribute information in the PSN tunnel information, and maps the data packets classified into the same type to a service transmission path of the same PON. That is to say, the data packets of all PWs of the same PSN tunnel are classified into one type, and mapped to the same GEM PORT/LLID.

Figure 9B:
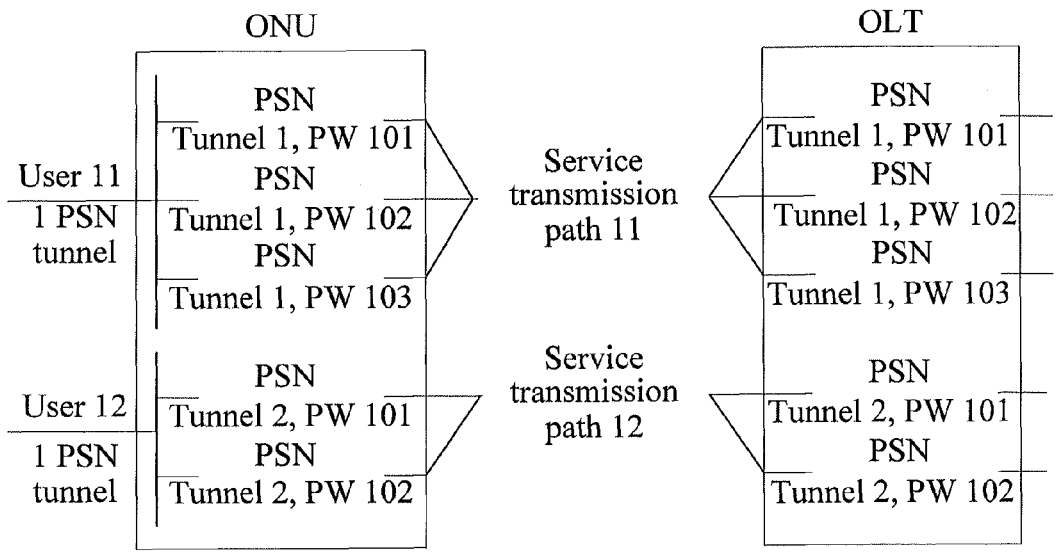
Figure 9C:
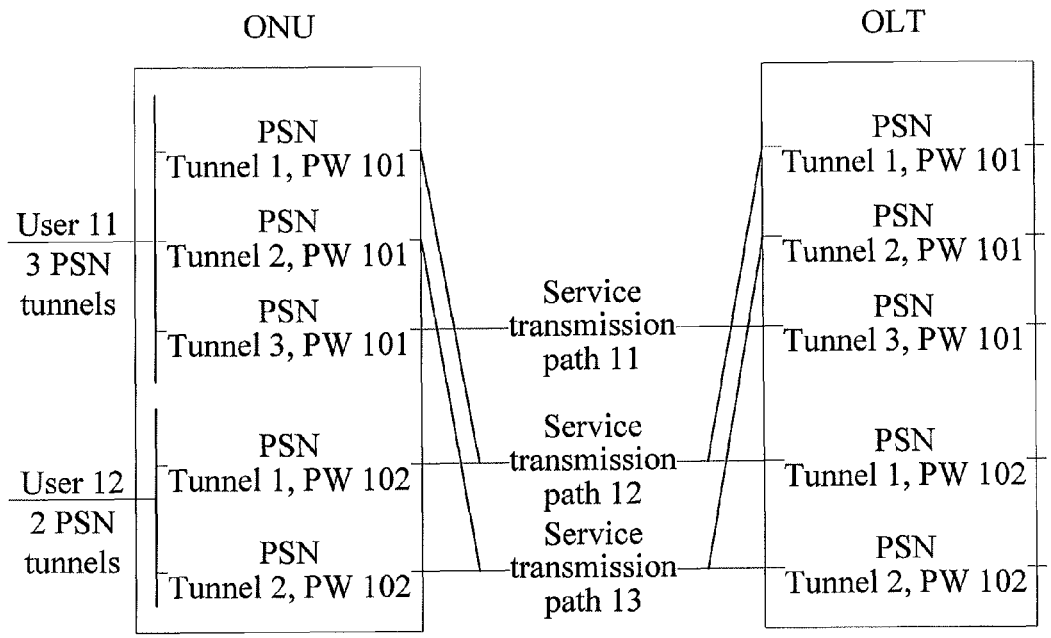

For example, as shown in FIGS. 9(b) and (c), in FIG. 9(b), in case that the user 11 is corresponding to PSN tunnel 1, and the user 12 is corresponding to PSN tunnel 2, the ONU maps data packets of all PWs (PW101, PW102, and PW103) of PSN tunnel 1 to GEM PORT11 for transmission, and maps data packets of all PWs (PW101 and PW102) of PSN tunnel 2 to GEM PORT12 for transmission. In FIG. 9(c), in case that the user 11 is corresponding to PW101, and the user 12 is corresponding to PW102, the ONU maps data packets of all PWs (PW101 and PW102) of PSN tunnel 1 to GEM PORT12 for transmission, maps data packets of all PWs (PW101 and PW102) of PSN tunnel 2 to GEM PORT13 for transmission, and maps data packets of all PWs (PW101) of PSN tunnel 3 to GEM PORT11 for transmission.

In the embodiment of the present invention, after receiving the data packets, the ONU adds the PSN tunnel information and/or the PW information to the data packets; and classifies the data packets according to the own attribute information in the PSN tunnel information and/or the PW information, and maps the data packets of the same type to a service transmission path of the same PON. Different PWs and/or PSN tunnels provide different QoSs for data transmission, and classification and mapping are performed according to the own attribute information in the PSN tunnel information and/or the PW information, so as to achieve mapping between a PON service transmission path and a PW and/or a PSN tunnel on a premise of ensuring QoS of data transmission.

In addition, the PSN tunnel information further includes CoS information and label information; and the PW information further includes CoS information and label information.

The ONU may further classify the data packets according to the CoS information and/or the label information in the PSN tunnel information or the PW information, and map the classified data packets respectively to service transmission paths of different PONs, through methods including the following.

A. The ONU classifies data packets having the same CoS information and the same label information into one type according to the CoS information and the label information in the PSN tunnel information or the PW information, and maps the data packets classified into the same type to a service transmission path of the same PON. That is to say, the data packets having the same CoS and the same label are classified into one type, and mapped to the same GEM PORT/LLID.

Figure 10A:
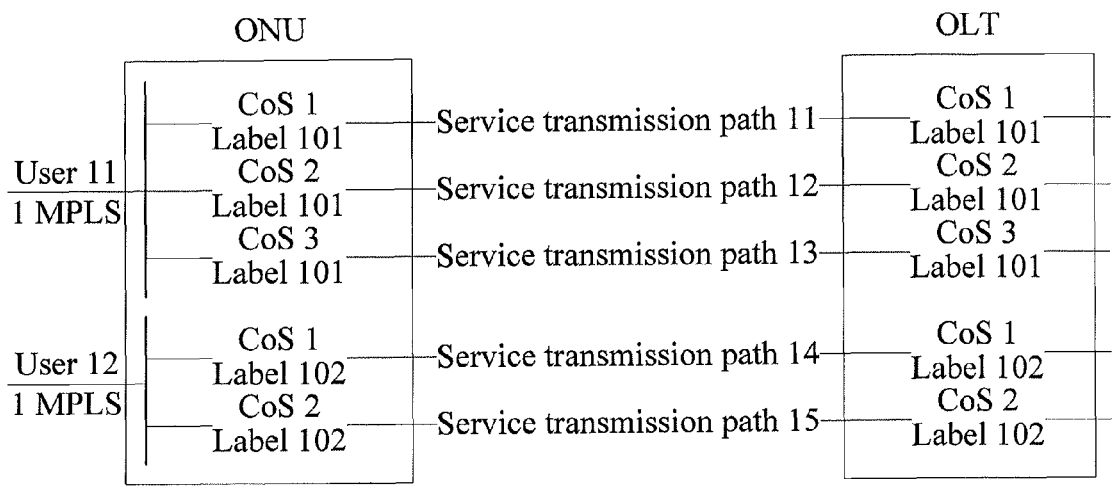
FIG. 10(a) is a principle diagram of mapping data packets of the same CoS and the same label by an ONU or an OLT to the same GEM PORT in case that one user is corresponding to one MPLS label, in an embodiment of the present invention; (b) is a principle diagram of mapping data packets of the same CoS and the same label by an ONU or an OLT to the same GEM PORT in case that one user is corresponding to one CoS, in an embodiment of the present invention; (c) is a principle diagram of mapping data packets of all CoSs having the same label by an ONU or an OLT to the same GEM PORT in case that one user is corresponding to one MPLS label, in an embodiment of the present invention; (d) is a principle diagram of mapping data packets of all CoSs having the same label by an ONU or an OLT to the same GEM PORT in case that one user is corresponding to one CoS, in an embodiment of the present invention; (e) is a principle diagram of mapping data packets of all labels having the same label by an ONU or an OLT to the same GEM PORT in case that one user is corresponding to one MPLS label, in an embodiment of the present invention; and (f) is a principle diagram of mapping data packets of all labels having the same label by an ONU or an OLT to the same GEM PORT in case that one user is corresponding to one CoS, in an embodiment of the present invention.
Figure 10B:
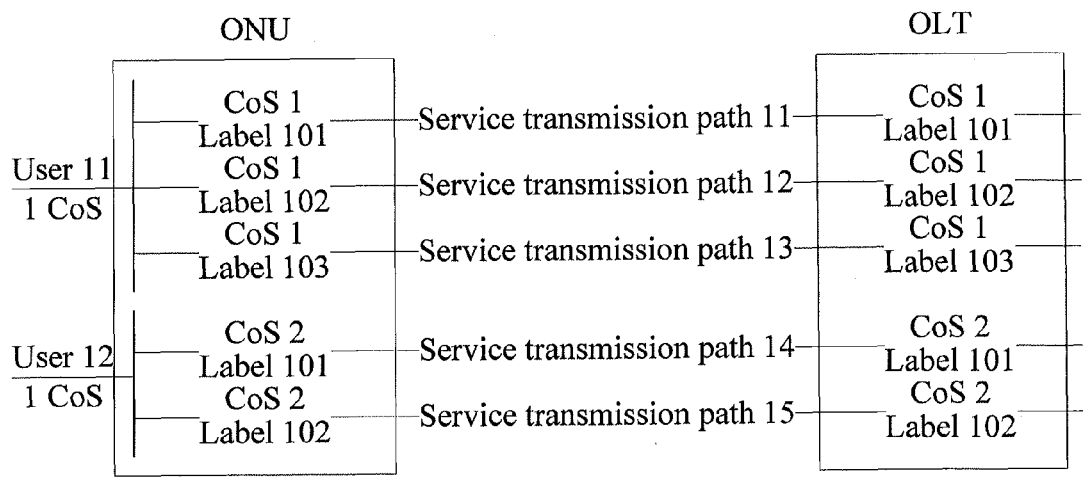

For example, as shown in FIGS. 10(a) and (b), in FIG. 10(a), in case that a user 11 is corresponding to MPLS label 101, and a user 12 is corresponding to MPLS label 102, the ONU maps data packets of CoS1 and MPLS label 101 to GEM PORT11 for transmission, maps data packets of CoS2 and MPLS label 101 to GEM PORT12 for transmission, . . . , and maps data packets of CoS2 and MPLS label 102 to GEM PORT15 for transmission. In FIG. 10(b), in case that the user 11 is corresponding to CoS1, and the user 12 is corresponding to CoS2, the ONU maps data packets of CoS1 and MPLS label 101 to GEM PORT11 for transmission, maps data packets of CoS1 and MPLS label 102 to GEM PORT12 for transmission, . . . , and maps data packets of CoS2 and MPLS label 102 to GEM PORT15 for transmission.

B. The ONU classifies data packets having the same label information into one type, according to the label information in the PSN tunnel information or the PW information, and maps the data packets classified into the same type to a service transmission path of the same PON. That is to say, the data packets of all CoSs having the same label are classified into one type, and mapped to the same GEM PORT/LLID.

Figure 10C:
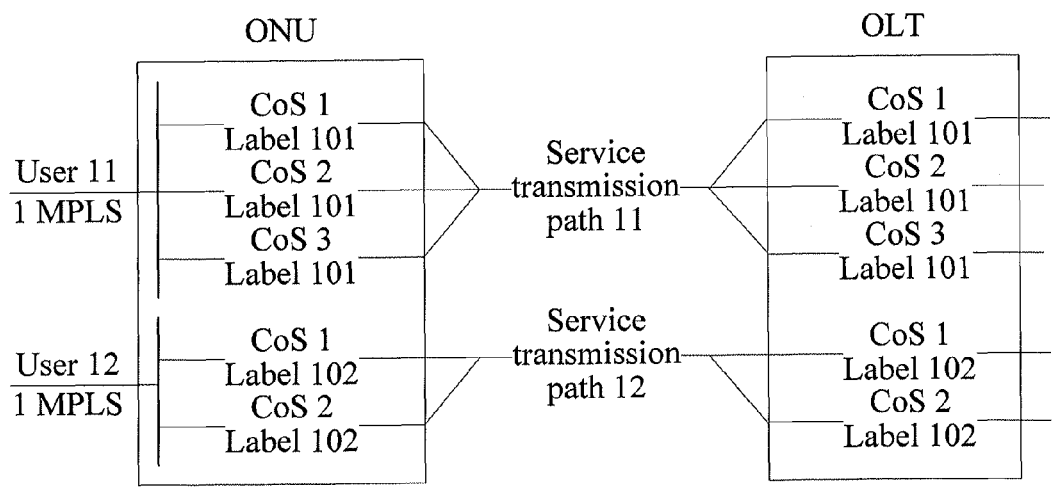
Figure 10D:
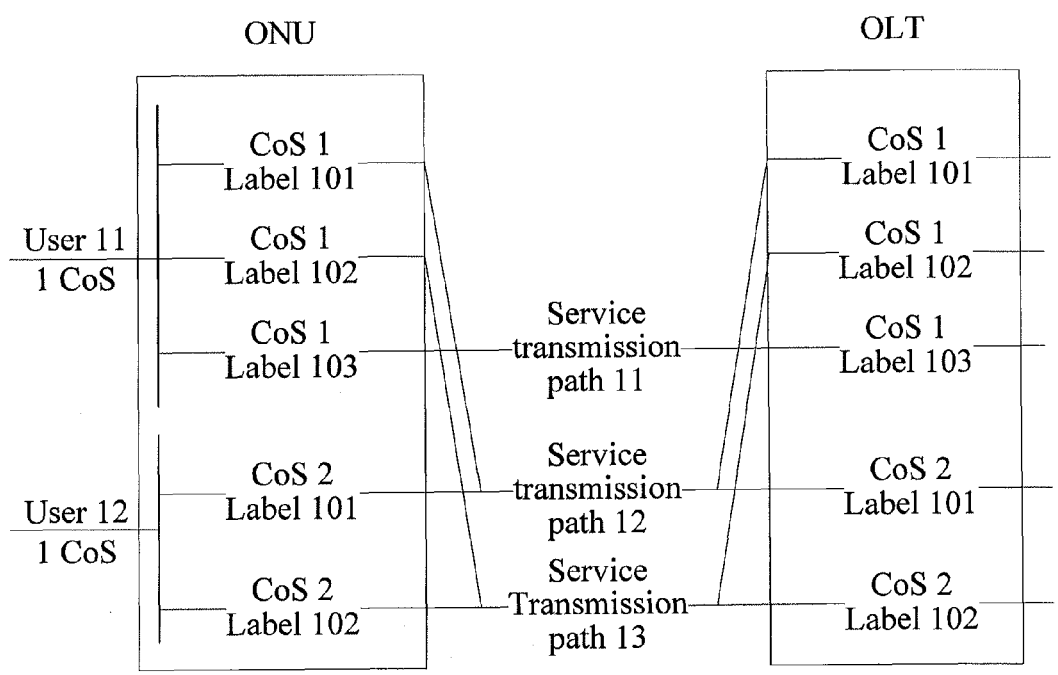

For example, as shown in FIGS. 10(c) and (d), in FIG. 10(c), in case that the user 11 is corresponding to MPLS label 101, and the user 12 is corresponding to MPLS label 102, the ONU maps data packets of all CoSs (CoS1, CoS2, and CoS3) having MPLS label 101 to GEM PORT11 for transmission, and maps data packets of all CoSs (CoS1 and CoS2) having MPLS label 102 to GEM PORT12 for transmission. In FIG. 10(d), in case that the user 11 is corresponding to CoS1, and the user 12 is corresponding to CoS2, the ONU maps data packets of all CoSs (CoS1 and CoS2) having MPLS label 101 to GEM PORT12 for transmission, maps data packets of all CoSs (CoS1 and CoS2) having MPLS label 102 to GEM PORT13 for transmission, and maps data packets of all CoSs (CoS1) having MPLS label 103 to GEM PORT11 for transmission.

C. The ONU classifies data packets having the same CoS information into one type according to the CoS information in the PSN tunnel information or the PW information, and maps the data packets classified into the same type to a service transmission path of the same PON. That is to say, the data packets of all labels having the same CoS are classified into one type, and mapped to the same GEM PORT/LLID.

Figure 10E:
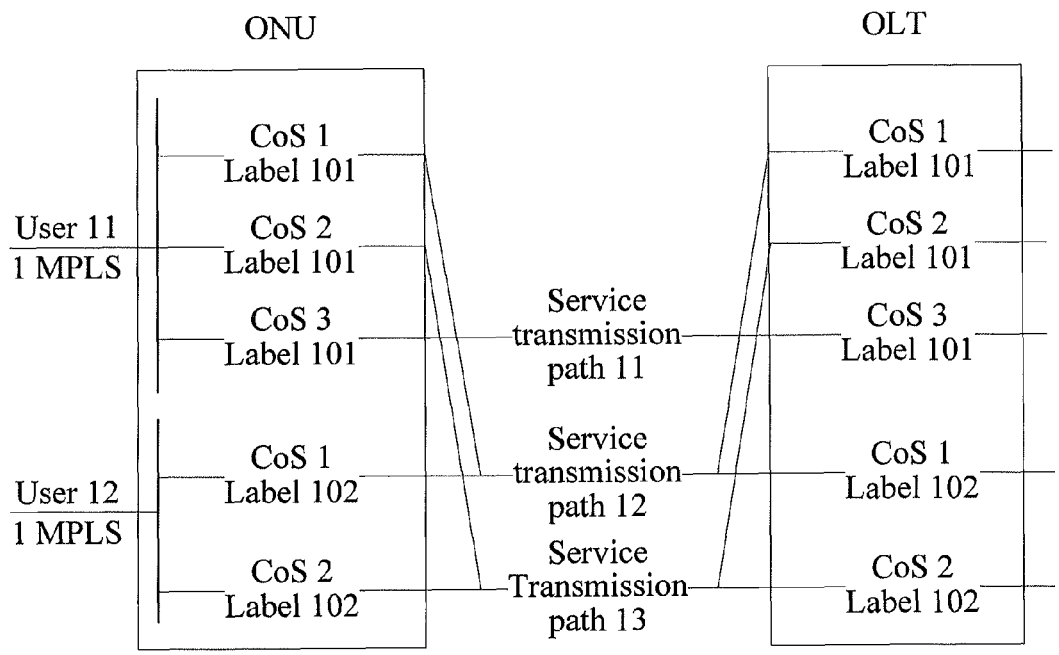
Figure 10F:
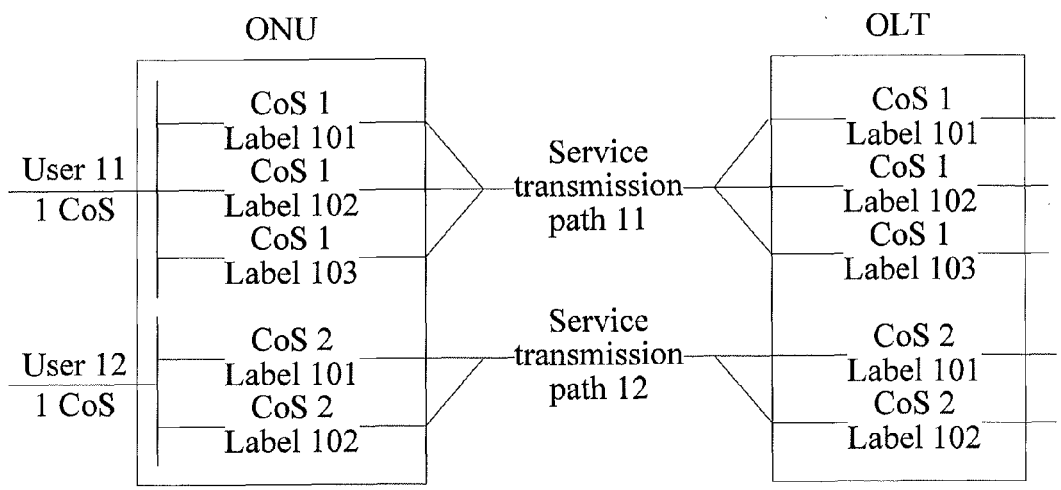

For example, as shown in FIGS. 10(e) and (f), in FIG. 10(e), in case that the user 11 is corresponding to MPLS label 101, and the user 12 is corresponding to MPLS label 102, the ONU maps data packets with all MPLS labels (label 101 and label 102) of CoS1 to GEM PORT12 for transmission, maps data packets with all MPLS labels (label 101 and label 102) of CoS2 to GEM PORT13 for transmission, and maps data packets with all MPLS labels (label 101) of CoS3 to GEM PORT11 for transmission. In FIG. 10(f), in case that the user 11 is corresponding to CoS1, and the user 12 is corresponding to CoS2, the ONU maps data packets with all MPLS labels (label 101, label 102, and label 103) of CoS1 to GEM PORT11 for transmission, and maps data packets with all MPLS labels (label 101 and label 102) of CoS2 to GEM PORT12 for transmission.

In addition, when the PON is a GPON, the ONU further needs to map the GEM PORT to a T-CONT in one of the following manners.

1. Different GEM PORTs are respectively mapped to different T-CONTs at 1:1.
2. Different GEM PORTs are mapped to different T-CONTs at N:1.
3. The ONU maps GEM PORTs of the same CoS to the same T-CONT according to the CoS information in the PSN tunnel information or the PW information.

In the embodiment of the present invention, the ONU may further classify the data packets according to the CoS information and/or the label information in the PSN tunnel information or the PW information, and maps the data packets of the same type to the service transmission path of the same PON. The CoS information and/or the label information in the PSN tunnel information or the PW information further identifies transmission QoS requirements of the data packets in detail, and classification and mapping are performed according to the CoS information and/or the label information in the PSN tunnel information or the PW information, so as to further achieve mapping between a PON service transmission path and a PW and/or a PSN tunnel on the premise of ensuring QoS of data transmission.

Figure 4:
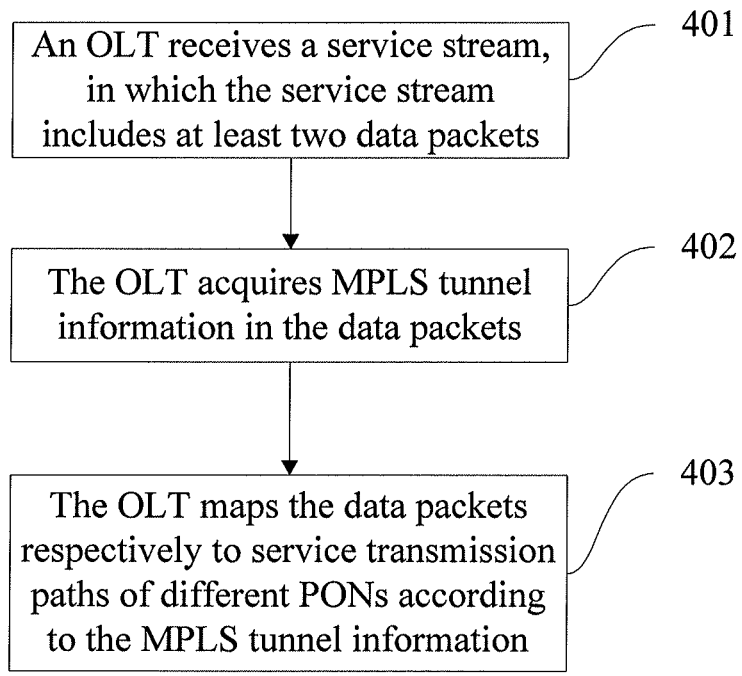
FIG. 4 is a schematic view of another mapping method for data transmission according to an embodiment of the present invention.

As shown in FIG. 4, in the downlink direction, the mapping method for data transmission according to the embodiment of the present invention includes the following steps.

In Step 401, an OLT receives a service stream, in which the service stream includes at least two data packets.

In an uplink direction from the OLT to an ONU, the OLT receives a service stream transferred from a network side, in which the service stream includes at least two data packets.

In Step 402, the OLT acquires MPLS tunnel information in the data packets, in which the MPLS tunnel information includes own attribute information, CoS information, and/or label information in PSN tunnel information and/or PW information.

In the downlink direction from the OLT to the ONU, the data packets received by the OLT carry MPLS tunnel information; and the OLT switches the MPLS tunnel information carried in the data packets. The MPLS tunnel information includes own attribute information, CoS information, and/or label information in PSN tunnel information and/or PW information; and the own attribute information in the PSN tunnel information and/or the PW information includes attribute identifiers that distinguish different PSN tunnel information and/or PW information.

In Step 403, the OLT classifies the data packets according to the MPLS tunnel information, and maps the classified data packets respectively to service transmission paths of different PONs.

The MPLS tunnel information includes the PSN tunnel information and/or the PW information; the PSN tunnel information includes the own attribute information; and the PW information includes the own attribute information. The OLT can distinguish PSN tunnels or PWs according to the own attribute information in the PSN tunnel information and/or the PW information. The OLT classifies the data packets according to the own attribute information, and maps the classified data packets respectively to service transmission paths of different PONs, through methods including the following.

1. The OLT classifies data packets having the same own attribute information in the PSN tunnel information and the same own attribute information in the PW information into one type according to the own attribute information in the PSN tunnel information and the PW information, and maps the data packets classified into the same type to a service transmission path of the same PON. That is to say, the data packets of the same PSN tunnel and the same PW are classified into one type, and mapped to the same GEM PORT/LLID.

For example, as shown in FIG. 9(*a*), in case that a user 11 is corresponding to PSN tunnel 1, and a user 12 is corresponding to PSN tunnel 2, the OLT maps data packets of PSN tunnel 1 and PW101 to GEM PORT11 for transmission, maps data packets of PSN tunnel 1 and PW102 to GEM PORT12 for transmission, . . . , and maps data packets of PSN tunnel 2 and PW102 to GEM PORT15 for transmission.

2. The OLT classifies data packets having the same own attribute information in the PSN tunnel information into one type according to the own attribute information in the PSN tunnel information, and maps the data packets classified into the same type to a service transmission path of the same PON. That is to say, the data packets of all PWs of the same PSN tunnel are classified into one type, and mapped to the same GEM PORT/LLID.

For example, as shown in FIGS. 9(*b*) and (*c*), in FIG. 9(*b*), in case that the user 11 is corresponding to PSN tunnel 1, and the user 12 is corresponding to PSN tunnel 2, the OLT maps data packets of all PWs (PW101, PW102, and PW103) of PSN tunnel 1 to GEM PORT11 for transmission, and maps data packets of all PWs (PW101 and PW102) of PSN tunnel 2 to GEM PORT12 for transmission. In FIG. 9(*c*), in case that the user 11 is corresponding to PW101, and the user 12 is corresponding to PW102, the OLT maps data packets of all PWs (PW101 and PW102) of PSN tunnel 1 to GEM PORT12 for transmission, maps data packets of all PWs (PW101 and PW102) of PSN tunnel 2 to GEM PORT13 for transmission, and maps data packets of all PWs (PW101) of PSN tunnel 3 to GEM PORT11 for transmission. In the embodiment of the present invention, after receiving the data packets, the OLT switches the PSN tunnel information and/or the PW information carried in the data packets; and classifies the data packets according to the own attribute information in the PSN tunnel information and/or the PW information, and maps the data packets of the same type to a service transmission path of the same PON. Different PWs and/or PSN tunnels provide different QoSs for data transmission, and classification and mapping are performed according to the own attribute information in the PSN tunnel information and/or the PW information, so as to achieve mapping between a PON service transmission path and a PW and/or a PSN tunnel on the premise of ensuring QoS of data transmission.

In addition, the PSN tunnel information further includes CoS information and label information; and the PW information further includes CoS information and label information.

The OLT may further classify the data packets according to the CoS information and/or the label information in the PSN tunnel information or the PW information, and map the classified data packets respectively to service transmission paths of different PONs, through methods including the following.

A. The OLT classifies data packets having the same CoS information and the same label information into one type according to the CoS information and the label information in the PSN tunnel information or the PW information, and maps the data packets classified into the same type to a service transmission path of the same PON. That is to say, the data packets having the same CoS and the same label are classified into one type, and mapped to the same GEM PORT/LLID.

For example, as shown in FIGS. 10(a) and (b), in FIG. 10(a), in case that a user 11 is corresponding to MPLS label 101, and a user 12 is corresponding to MPLS label 102, the OLT maps data packets of CoS1 and MPLS label 101 to GEM PORT11 for transmission, maps data packets of CoS2 and MPLS label 101 to GEM PORT12 for transmission, . . . , and maps data packets of CoS2 and MPLS label 102 to GEM PORT15 for transmission. In FIG. 10(b), in case that the user 11 is corresponding to CoS1, and the user 12 is corresponding to CoS2, the OLT maps data packets of CoS1 and MPLS label 101 to GEM PORT11 for transmission, maps data packets of CoS1 and MPLS label 102 to GEM PORT12 for transmission, . . . , and maps data packets of CoS2 and MPLS label 102 to GEM PORT15 for transmission.

B. The OLT classifies data packets having the same label information into one type, according to the label information in the PSN tunnel information or the PW information, and maps the data packets classified into the same type to a service transmission path of the same PON. That is to say, the data packets of all CoSs having the same label are classified into one type, and mapped to the same GEM PORT/LLID.

For example, as shown in FIGS. 10(c) and (d), in FIG. 10(c), in case that the user 11 is corresponding to MPLS label 101, and the user 12 is corresponding to MPLS label 102, the OLT maps data packets of all CoSs (CoS1, CoS2, and CoS3) having MPLS label 101 to GEM PORT11 for transmission, and maps data packets of all CoSs (CoS1 and CoS2) having MPLS label 102 to GEM PORT12 for transmission. In FIG. 10(d), in case that the user 11 is corresponding to CoS1, and the user 12 is corresponding to CoS2, the OLT maps data packets of all CoSs (CoS1 and CoS2) having MPLS label 101 to GEM PORT12 for transmission, maps data packets of all CoSs (CoS1 and CoS2) having MPLS label 102 to GEM PORT13 for transmission, and maps data packets of all CoSs (CoS1) having MPLS label 103 to GEM PORT11 for transmission.

C. The OLT classifies data packets having the same CoS information into one type according to the CoS information in the PSN tunnel information or the PW information, and maps the data packets classified into the same type to a service transmission path of the same PON. That is to say, the data packets of all labels having the same CoS are classified into one type, and mapped to the same GEM PORT/LLID.

For example, as shown in FIGS. 10(e) and (f), in FIG. 10(e), in case that the user 11 is corresponding to MPLS label 101, and the user 12 is corresponding to MPLS label 102, the OLT maps data packets with all MPLS labels (label 101 and label 102) of CoS1 to GEM PORT12 for transmission, maps data packets with all MPLS labels (label 101 and label 102) of CoS2 to GEM PORT13 for transmission, and maps data packets with all MPLS labels (label 101) of CoS3 to GEM PORT11 for transmission. In FIG. 10(f), in case that the user 11 is corresponding to CoS1, and the user 12 is corresponding to CoS2, the OLT maps data packets with all MPLS labels (label 101, label 102, and label 103) of CoS1 to GEM PORT11 for transmission, and maps data packets with all MPLS labels (label 101 and label 102) of CoS2 to GEM PORT12 for transmission.

In the embodiment of the present invention, the OLT may further classify the data packets according to the CoS information and/or the label information in the PSN tunnel information or the PW information, and maps the data packets of the same type to the service transmission path of the same PON. The CoS information and/or the label information in the PSN tunnel information or the PW information further identifies transmission QoS requirements of the data packets in detail, and classification and mapping are performed according to the CoS information and/or the label information in the PSN tunnel information or the PW information, so as to further achieve mapping between a PON service transmission path and a PW and/or a PSN tunnel on the premise of ensuring QoS of data transmission.

Figure 5:
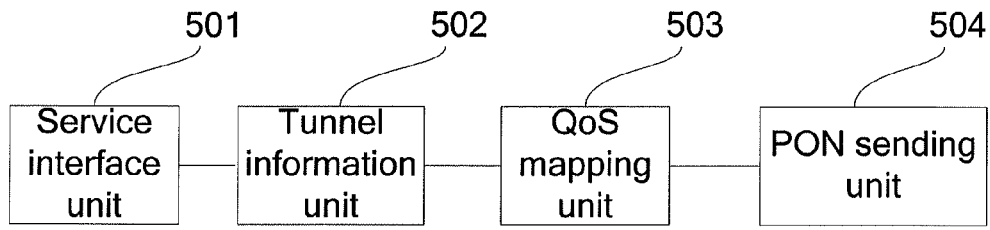
FIG. 5 is a structural view of a mapping apparatus for data transmission according to an embodiment of the present invention.

In order to ensure QoS of data transmission after mapping between a PON service transmission path and a PW and/or a PSN tunnel, in an embodiment, the present invention provides a mapping apparatus for data transmission. As shown in FIG. 5, the mapping apparatus for data transmission according to the embodiment of the present invention includes a QoS mapping unit 503.

The QoS mapping unit 503 is configured to classify data packets according to MPLS tunnel information, and map the classified data packets respectively to service transmission paths of different PONs.

The MPLS tunnel information includes PSN tunnel information and/or PW information; the PSN tunnel information includes own attribute information; and the PW information includes own attribute information. The own attribute information in the PSN tunnel information and/or the PW information includes attribute identifiers that distinguish different PSN tunnel information and/or PW information.

The QoS mapping unit 503 classifies the data packets according to the own attribute information in the PSN tunnel information and/or the PW information, and maps the classified data packets respectively to service transmission paths of different PONs.

In addition, the PSN tunnel information further includes CoS information and label information; and the PW information further includes CoS information and label information. The QoS mapping unit 503 maps the data packets respectively to service transmission paths of different PONs according to the CoS information and/or the label information in the PSN tunnel information or the PW information.

Before the classifying and the mapping, the mapping apparatus for data transmission according to the embodiment of the present invention further needs to receive the data packets, and acquire the MPLS tunnel information in the data packets; and further needs to send the data packets after classifying and the mapping. Therefore, the mapping apparatus for data transmission according to the embodiment of the present invention further includes a service interface unit 501, a tunnel information unit 502, and a PON sending unit 504.

The service interface unit 501 is configured to receive a service stream, in which the service stream includes at least two data packets.

The tunnel information unit 502 is configured to acquire the MPLS tunnel information in the data packets, in which the MPLS tunnel information includes the own attribute information, the CoS information, and/or the label information in the PSN tunnel information and/or the PW information.

The PON sending unit 504 is configured to send the data packets through the service transmission paths to which the data packets are mapped.

In the embodiment of the present invention, the QoS mapping unit 503 maps the data packets respectively to the service transmission paths of different PONs, according to the MPLS tunnel information, so as to achieve mapping between a PON service transmission path and a PW and/or a PSN tunnel on the premise of ensuring QoS of data transmission. The mapping apparatus for data transmission includes an OLT or an ONU. Hereinafter, a specific embodiment of the mapping apparatus for data transmission is described respectively with the OLT and the ONU as examples.

Figure 6:
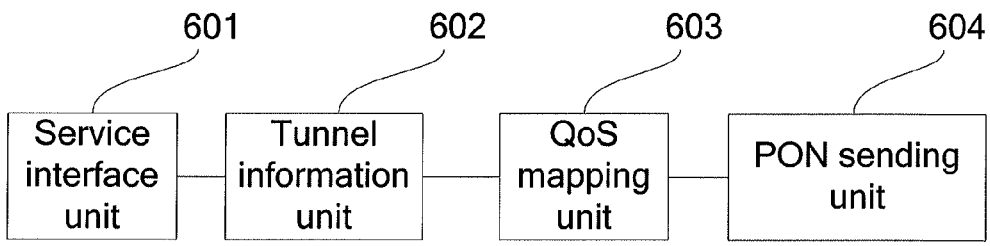
FIG. 6 is a structural view of an OLT for data transmission according to an embodiment of the present invention.

As shown in FIG. 6, the OLT for data transmission according to an embodiment of the present invention includes a QoS mapping unit 603.

The QoS mapping unit 603 is configured to classify data packets according to MPLS tunnel information, and map the classified data packets respectively to service transmission paths of different PONs.

The MPLS tunnel information includes PSN tunnel information and/or PW information; the PSN tunnel information includes own attribute information; and the PW information includes own attribute information. The own attribute information in the PSN tunnel information and/or the PW information includes attribute identifiers that distinguish different PSN tunnel information and/or PW information.

The QoS mapping unit 603 classifies the data packets according to the own attribute information in the PSN tunnel information and/or the PW information, and maps the classified data packets respectively to service transmission paths of different PONs, through methods including the following.

1. The QoS mapping unit 603 classifies data packets having the same own attribute information in the PSN tunnel information and the same own attribute information in the PW information into one type according to the own attribute information in the PSN tunnel information and the PW information, and maps the data packets classified into the same type to a service transmission path of the same PON. That is to say, the data packets of the same PSN tunnel and the same PW are classified into one type, and mapped to the same GEM PORT/LLID.

2. The QoS mapping unit 603 classifies data packets having the same own attribute information in the PSN tunnel information into one type according to the own attribute information in the PSN tunnel information, and maps the data packets classified into the same type to a service transmission path of the same PON. That is to say, the data packets of all PWs of the same PSN tunnel are classified into one type, and mapped to the same GEM PORT/LLID.

In the embodiment of the present invention, the QoS mapping unit 603 classifies the data packets according to the own attribute information in the PSN tunnel information and/or the PW information, and maps the data packets of the same type to a service transmission path of the same PON. Different PWs and/or PSN tunnels provide different QoSs for data transmission, and classification and mapping are performed according to the own attribute information in the PSN tunnel information and/or the PW information, so as to achieve mapping between a PON service transmission path and a PW and/or a PSN tunnel on the premise of ensuring QoS of data transmission.

In addition, the PSN tunnel information further includes CoS information and label information; and the PW information further includes CoS information and label information. The QoS mapping unit 603 may further classify the data packets according to the CoS information and/or the label information in the PSN tunnel information or the PW information, and map the classified data packets respectively to service transmission paths of different PONs, through methods including the following.

A. The QoS mapping unit 603 classifies data packets having the same CoS information and the same label information into one type according to the CoS information and the label information in the PSN tunnel information or the PW information, and maps the data packets classified into the same type to a service transmission path of the same PON. That is to say, the data packets having the same CoS, and the same label are classified into one type, and mapped to the same GEM PORT/LLID.

B. The QoS mapping unit 603 classifies data packets having the same label information into one type, according to the label information in the PSN tunnel information or the PW information, and maps the data packets classified into the same type to a service transmission path of the same PON. That is to say, the data packets of all CoSs having the same label are classified into one type, and mapped to the same GEM PORT/LLID.

C. The QoS mapping unit 603 classifies data packets having the same CoS information into one type according to the CoS information in the PSN tunnel information or the PW information, and maps the data packets classified into the same type to a service transmission path of the same PON. That is to say, the data packets of all labels having the same CoS are classified into one type, and mapped to the same GEM PORT/LLID.

In the embodiment of the present invention, the QoS mapping unit 603 may further classify the data packets according to the CoS information and/or the label information in the PSN tunnel information or the PW information, and maps the data packets of the same type to the service transmission path of the same PON. The CoS information and/or the label information in the PSN tunnel information or the PW information further identifies transmission QoS requirements of the data packets in detail, and classification and mapping are performed according to the CoS information and/or the label information in the PSN tunnel information or the PW information, so as to further achieve mapping between a PON service transmission path and a PW and/or a PSN tunnel on the premise of ensuring QoS of data transmission.

Before the classifying and the mapping, the OLT for data transmission according to the embodiment of the present invention further needs to receive the data packets, and acquire the MPLS tunnel information in the data packets; and further needs to send the data packets after the classifying and the mapping. Therefore, the OLT for data transmission according to the embodiment of the present invention further includes a service interface unit 601, a tunnel information unit 602, and a PON sending unit 604.

The service interface unit 601 is configured to receive a service stream, in which the service stream includes at least two data packets.

The tunnel information unit 602 is configured to switch MPLS tunnel information carried in the data packets, in which the MPLS tunnel information includes the own attribute information, the CoS information, and/or the label information in the PSN tunnel information and/or the PW information.

The PON sending unit 604 is configured to send the data packets through the service transmission paths to which the data packets are mapped.

In the embodiment of the present invention, the QoS mapping unit 603 only classifies and maps the data packets in a downlink direction. Hereinafter, a process for forwarding downlink data by an OLT is described in detail, which includes the following steps.

The service interface unit 601 receives a service stream from a network side, in which the service stream includes at least two data packets; the tunnel information unit 602 switches MPLS tunnel information carried in the data packets; the QoS mapping unit 603 maps the data packets respectively to GEM PORT/LLIDs of different PONs according to the MPLS tunnel information processed by the tunnel information unit 602, following the methods as described above; and the PON sending unit 604 sends the data packets through the GEM PORT/LLIDs to which the data packets are mapped.

Figure 7:
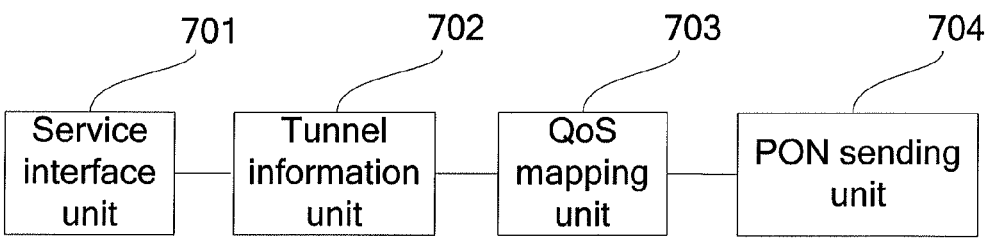
FIG. 7 is a structural view of an ONU for data transmission according to an embodiment of the present invention.

As shown in FIG. 7, the ONU for data transmission according to an embodiment of the present invention includes a QoS mapping unit 703.

The QoS mapping unit 703 is configured to classify data packets according to MPLS tunnel information, and map the classified data packets respectively to service transmission paths of different PONs.

The MPLS tunnel information includes PSN tunnel information and/or PW information; and the PSN tunnel information includes own attribute information; and the PW information includes own attribute information. The own attribute information in the PSN tunnel information and/or the PW information includes attribute identifiers that distinguish different PSN tunnel information and/or PW information.

The QoS mapping unit 703 classifies the data packets according to the own attribute information in the PSN tunnel information and/or the PW information, and maps the classified data packets respectively to service transmission paths of different PONs, through methods including the following.

1. The QoS mapping unit 703 classifies data packets having the same own attribute information in the PSN tunnel information and the same own attribute information in the PW information into one type according to the own attribute information in the PSN tunnel information and the PW information, and maps the data packets classified into the same type to a service transmission path of the same PON. That is to say, the data packets of the same PSN tunnel and the same PW are classified into one type, and mapped to the same GEM PORT/LLID.

2. The QoS mapping unit 703 classifies data packets having the same own attribute information in the PSN tunnel information into one type according to the own attribute information in the PSN tunnel information, and maps the data packets classified into the same type to a service transmission path of the same PON. That is to say, the data packets of all PWs of the same PSN tunnel are classified into one type, and mapped to the same GEM PORT/LLID.

In the embodiment of the present invention, the QoS mapping unit 703 classifies the data packets according to the own attribute information in the PSN tunnel information and/or the PW information, and maps the data packets of the same type to a service transmission path of the same PON. Different PWs and/or PSN tunnels provide different QoSs for data transmission, and classification and mapping are performed according to the own attribute information in the PSN tunnel information and/or the PW information, so as to achieve mapping between a PON service transmission path and a PW and/or a PSN tunnel on the premise of ensuring QoS of data transmission.

In addition, the PSN tunnel information further includes CoS information and label information; and the PW information further includes CoS information and label information. The QoS mapping unit 703 may further classify the data packets according to the CoS information and/or the label information in the PSN tunnel information or the PW information, and map the classified data packets respectively to service transmission paths of different PONs, through methods including the following.

A. The QoS mapping unit 703 classifies data packets having the same CoS information and the same label information into one type according to the CoS information and the label information in the PSN tunnel information or the PW information, and maps the data packets classified into the same type to a service transmission path of the same PON. That is to say, the data packets having the same CoS and the same label are classified into one type, and mapped to the same GEM PORT/LLID.

B. The QoS mapping unit 703 classifies data packets having the same label information into one type, according to the label information in the PSN tunnel information or the PW information, and maps the data packets classified into the same type to a service transmission path of the same PON. That is to say, the data packets of all CoSs having the same label are classified into one type, and mapped to the same GEM PORT/LLID.

C. The QoS mapping unit 703 classifies data packets having the same CoS information into one type according to the CoS information in the PSN tunnel information or the PW information, and maps the data packets classified into the same type to a service transmission path of the same PON. That is to say, the data packets of all labels having the same CoS are classified into one type, and mapped to the same GEM PORT/LLID.

In addition, when the PON is a GPON, the QoS mapping unit 703 further needs to map the GEM PORT to a T-CONT in one of the following manners.

1. Different GEM PORTs are respectively mapped to different T-CONTs at 1:1.

2. Different GEM PORTs are mapped to different T-CONTs at N:1.

3. The QoS mapping unit 703 maps GEM PORTs of the same CoS information to the same T-CONT according to the CoS information in the PSN tunnel information or the PW information.

In the embodiment of the present invention, the QoS mapping unit 703 may further classify the data packets according to the CoS information and/or the label information in the PSN tunnel information or the PW information, and map the data packets of the same type to the service transmission path of the same PON. The CoS information and/or the label information in the PSN tunnel information or the PW information further identifies transmission QoS requirements of the data packets in detail, and classification and mapping are performed according to the CoS information and/or the label information in the PSN tunnel information or the PW information, so as to further achieve mapping between a PON service transmission path and a PW and/or a PSN tunnel on the premise of ensuring QoS of data transmission.

Before the classifying and the mapping, the ONU for data transmission according to the embodiment of the present invention further needs to receive the data packets, and acquire the MPLS tunnel information in the data packets; and further needs to send the data packets after the classifying and the mapping. Therefore, the ONU for data transmission according to the embodiment of the present invention further includes a service interface unit 701, a tunnel information unit 702, and a PON sending unit 704.

The service interface unit 701 is configured to receive a service stream, in which the service stream includes at least two data packets.

The tunnel information unit 702 is configured to add MPLS tunnel information to the data packets, in which the MPLS tunnel information includes the own attribute information, the CoS information, and/or the label information in the PSN tunnel information and/or the PW information.

The PON sending unit 704 is configured to send the data packets through the service transmission paths to which the data packets are mapped.

In the embodiment of the present invention, the QoS mapping unit 703 only classifies and maps the data packets in an uplink direction. Hereinafter, a process for forwarding downlink data by an ONU is described in detail. The process for forwarding uplink data by the ONU includes the following steps.

The service interface unit 701 receives a service stream from a user side, in which the service stream includes at least two data packets; the tunnel information unit 702 adds MPLS tunnel information to the data packets; the QoS mapping unit 703 maps the data packets respectively to GEM PORT/LLIDs of different PONs according to the MPLS tunnel information processed by the tunnel information unit 702, following the methods as described above; and the PON sending unit 704 sends the data packets through the GEM PORT/LLIDs to which the data packets are mapped.

Figure 8:
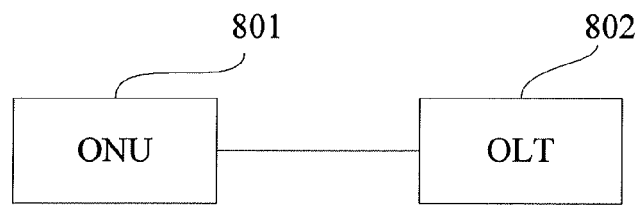
FIG. 8 is a structural view of a mapping system for data transmission according to an embodiment of the present invention.

In order to ensure QoS of data transmission after mapping between a PON service transmission path and a PW and/or a PSN tunnel, in an embodiment, the present invention provides a mapping system for data transmission. As shown in FIG. 8, the mapping system for data transmission according to the embodiment of the present invention includes an ONU 801 and an OLT 802, in which the ONU 801 and the OLT 802 have at least one service transmission path.

The ONU 801 receives a service stream including at least two data packets, and acquires MPLS tunnel information in the data packets; and classifies the data packets according to the MPLS tunnel information, maps the classified data packets respectively to service transmission paths of different PONs, and sends the data packets to the OLT 802.

Alternatively, the OLT 802 receives a service stream including at least two data packets, and acquires MPLS tunnel information in the data packets; and classifies the data packets according to the MPLS tunnel information, maps the classified data packets respectively to service transmission paths of different PONs, and sends the data packets to the ONU 801.

The MPLS tunnel information includes own attribute information, CoS information, and/or label information in PSN tunnel information and/or PW information.

Those of ordinary skill in the art should understand that all or a part of the steps of the method according to the embodiments of the present invention may be implemented by a program instructing relevant hardware. The program may be stored in a computer readable storage medium. When the program is run, the steps of the method according to the embodiments of the present invention are performed. The storage medium may be a magnetic disk, an optical disk, a Read-Only Memory (ROM), and a Random Access Memory (RAM).

The above descriptions are merely embodiments of the present invention, but are not intended to limit the scope of the present invention. Any modification, equivalent replacement, or improvement made without departing from the spirit and principle of the present invention should fall within the scope of the present invention as defined by the appended claims.

What is claimed is:

1. A mapping method for data transmission performed by one of an Optical Network Unit (ONU) or an Optical Network Terminal (ONT), comprising:
   receiving a data packet;
   acquiring Multi Protocol Label Switch (MPLS) tunnel information in the data packet, wherein the MPLS tunnel information comprises Packet Switched Network (PSN) tunnel information;
   mapping the data packet to a service transmission path of a Passive Optical Network (PON) according to the MPLS tunnel information, wherein the service transmission path provides Quality of Service (QoS) corresponding to the MPLS tunnel information; and
   sending the data packet through the service transmission path.

2. The mapping method for data transmission according to claim 1, wherein the PSN tunnel information comprises at least one of attribute identifiers that distinguish different PSN tunnels, Class of Service (CoS) information and label information.

3. The mapping method for data transmission according to claim 1, wherein:
   the MPLS tunnel information further comprises Pseudo Wire (PW) information; and at least one of the PSN tunnel information and the PW information comprises Class of Service (CoS) information; and
   the mapping step comprise: mapping the data packet to the service transmission path according to the CoS information.

4. The mapping method for data transmission according to claim 1, wherein:
   the MPLS tunnel information further comprises Pseudo Wire (PW) information; and at least one of the PSN tunnel information and the PW information comprises label information; and
   the mapping step comprise: mapping the data packet to the service transmission path according to the label information.

5. A mapping apparatus for data transmission, comprising:
   a service interface unit, configured to receive a data packet;
   a tunnel information unit, configured to acquire Multi Protocol Label Switch (MPLS) tunnel information in the data packet, wherein the MPLS tunnel information comprises Packet Switched Network (PSN) tunnel information;
   a Quality of Service (QoS) mapping unit, configured to map the data packet to a service transmission path of a Passive Optical Network (PON) according to the MPLS tunnel information, wherein the service transmission path provides Quality of Service (QoS) corresponding to the MPLS tunnel information; and
   a PON sending unit, configured to send the data packet through the service transmission path.

6. The mapping apparatus for data transmission according to claim 5, wherein the apparatus is an Optical Network Unit (ONU) or an Optical Line Terminal (OLT).

7. The mapping apparatus for data transmission according to claim 5, wherein the PSN tunnel information comprises at least one of attribute identifiers that distinguish different PSN tunnels, Class of Service (CoS) information and label information.

8. The mapping apparatus for data transmission according to claim 5, wherein:
   the MPLS tunnel information further comprises Pseudo Wire (PW) information; and at least one of the PSN tunnel information and the PW information comprises Class of Service (CoS) information; and
   the QoS mapping unit is specifically configured to map the data packet to the service transmission path according to the CoS information.

9. The mapping apparatus for data transmission according to claim 5, wherein:
   the MPLS tunnel information further comprises Pseudo Wire (PW) information; and at least one of the PSN tunnel information and the PW information comprises label information; and
   the QoS mapping unit is specifically configured to map the data packet to the service transmission path according to the label information.

10. A mapping method for data transmission performed by an Optical Network Unit (ONU) or an Optical Network Terminal (ONT), comprising:

receiving a data packet;

acquiring Multi Protocol Label Switch (MPLS) tunnel information in the data packet, wherein the MPLS tunnel information comprises at least one of Class of Service (CoS) information and label information in Pseudo Wire (PW) information;

mapping the data packet to a service transmission path of a Passive Optical Network (PON) according to the MPLS tunnel information, wherein the service transmission path provides Quality of Service (QoS) corresponding to the MPLS tunnel information; and sending the data packet through the service transmission path.

11. A mapping apparatus for data transmission, comprising:

a service interface unit, configured to receive a data packet;

a tunnel information unit, configured to acquire Multi Protocol Label Switch (MPLS) tunnel information in the data packet, wherein the MPLS tunnel information comprises at least one of Class of Service (CoS) information and label information in Pseudo Wire (PW) information;

a Quality of Service (QoS) mapping unit, configured to map the data packet to a service transmission path of a Passive Optical Network (PON) according to the MPLS tunnel information, wherein the service transmission path provides Quality of Service (QoS) corresponding to the MPLS tunnel information; and a PON sending unit, configured to send the data packet through the service transmission path.

* * * * *